United States Patent
Huang

(10) Patent No.: US 10,353,276 B2
(45) Date of Patent: Jul. 16, 2019

(54) DETACHABLE LENS STRUCTURE AND METHOD OF MANUFACTURING THE SAME

(71) Applicant: MKD Technology Inc., Hsinchu City (TW)

(72) Inventor: Ming-Chia Huang, Hsinchu (TW)

(73) Assignee: MKD Technology Inc., Hsinchu (TW)

(*) Notice: Subject to any disclaimer, the term of this patent is extended or adjusted under 35 U.S.C. 154(b) by 85 days.

(21) Appl. No.: 15/832,488

(22) Filed: Dec. 5, 2017

(65) Prior Publication Data

US 2019/0171087 A1    Jun. 6, 2019

(51) Int. Cl.
  *G02B 7/02* (2006.01)
  *G03B 17/14* (2006.01)
  *G02B 7/14* (2006.01)

(52) U.S. Cl.
  CPC ............ *G03B 17/14* (2013.01); *G02B 7/14* (2013.01)

(58) Field of Classification Search
  CPC .......... G02B 7/02; G02B 7/022; G02B 7/026; G02B 7/14; G03B 17/14
  See application file for complete search history.

(56) References Cited

U.S. PATENT DOCUMENTS

2004/0189862 A1\* 9/2004 Gustavsson ........ G02B 13/0015
348/376

\* cited by examiner

*Primary Examiner* — Joseph P Martinez
(74) *Attorney, Agent, or Firm* — Wang Law Firm, Inc.

(57) ABSTRACT

A detachable lens structure and a method of manufacturing the same are disclosed. The detachable lens structure includes a front protection case, a back protection case, a front lid, a back lid, a lens, and a photo-sensing package module. The front protection case and the back protection case are detachably jointed together to form a space for accommodating the front lid, the back lid, the lens, and the photo-sensing package module. The front protection case is provided with a first opening aligning one end of the lens, and the front lid is provided with a second opening aligning the other end of the lens and a photo-sensing device of the photo-sensing package module. The back lid is provided with a third opening aligning a connection slot of the photo-sensing package module. The front and back lids are detachably connected to expose part of the connection slot.

6 Claims, 7 Drawing Sheets

DETACHABLE LENS STRUCTURE AND METHOD OF MANUFACTURING THE SAME

BACKGROUND OF THE INVENTION

1. Field of the Invention

The present invention generally relates to a detachable lens structure, and more specifically to a detachable lens structure provided with a front protection case and a back protection case detachably jointed together to form a space for accommodating a front lid, a back lid, a lens, and a photo-sensing package module, a package element of the photo-sensing package module employed to integrate a plurality of electronic devices or electronic modules through System in Package (SiP) technology.

2. The Prior Arts

In the prior arts, the lens products are manufactured by the traditional Printed Circuit Board Assembly (PCBA) process, in which the circuit board is first pattern transferred, electroplated, and etched to form a specific circuit pattern, and electronic elements or modules are then directly soldered on the circuit board. Also, the photo-sensing device is soldered on the circuit board. Further, the circuit board is drilled to form through holes corresponding to the photo-sensing device for fixing the lens. Finally, the lens is soldered on the corresponding place of the circuit board as shown in FIG. 1.

The traditional PCBA process needs lots of elements and the processing steps, and each processing step is complicated. Also, a lot of factors are related to yield rate of the final product like acidity, humidity, temperature. Additionally, oxidation and connection strength between the circuit board the soldered element and the solder influence quality and life time of the final produce such as panel. Furthermore, if the number of the electronic element or modules increases, the size of the circuit board increases, leading to difficulties in assembling the elements in subsequent processes. Thus, the field of actual applications is quite limited.

Therefore, it is greatly needed to provide a new lens structure, in which the package element is formed by System in Package technology to package electronic elements or modules so as to decrease the processing steps, increase efficiency of integration design, shrink area of the circuit board, simplify complexity of the circuit board, and decrease power consumption of the circuit board.

In addition, the lens structure is detachable, and easily replaced and assembled, thereby overcoming the problems of replacing both the lens and the circuit board in the prior arts.

SUMMARY OF THE INVENTION

The primary objective of the present invention is to provide a detachable lens structure, which comprises a front protection case, a back protection case, a front lid, a back lid, a lens, and a photo-sensing package module. The front protection case and the back protection case are detachably jointed together to form an accommodating space for accommodating the front lid, the back lid, the lens, and the photo-sensing package module. The front lid and the back lid are similarly detachably jointed together, and the photo-sensing package module is located between the front lid and the back lid.

Further, the front protection case is provided with a first opening, and the back protection case has a through hole for the connection line and the connection line plug connected together to pass through. The front lid is provided with a second opening, and the back lid is provided with a third opening. The photo-sensing package module comprises a circuit board, a circuit, a package element, a connection slot, and a photo-sensing device. The package element and the connection slot are located on one side of the circuit board, and the photo-sensing device is inlaid in the other side of the circuit board. The package element, the connection slot, and the photo-sensing device are electrically connected to the circuit.

The first opening of the front protection case aligns one end of the lens, and located at the mediate region of the front protection case. The other end of the lens aligns and joints the second opening of the front lid. The photo-sensing device of the photo-sensing package module aligns the second opening, which is located at and outward extends from the mediate region of the front lid. The third opening of the back lid aligns the connection slot of the photo-sensing package module with part of the connection slot exposed. The connection line plug of the back lid aligns the exposed connection slot.

Specifically, the package element is formed by System in Package (SiP) technology to package electronic elements or modules. The package element and the connection slot are inlaid on the same side of the circuit board, and the photo-sensing device is inlaid on the other side of the circuit board, and located at the mediate region of the circuit board.

The photo-sensing device is preferably implemented by a charge-coupled device (CCD) or a complementary metal-oxide-semiconductor (CMOS).

In particular, the front protection case is provided with a first water-proof ring and a second water-proof ring, and has a first slot and a second slot. The first slot is around the front protection case, the second slot is around the first opening, the first slot accommodates the first water-proof ring to make the front protection case and the back protection case tightly jointed, and the second slot accommodates the second water-proof ring to make the first opening and the lens tightly jointed. As a result, an effect of double water-proof protection is achieved.

More specifically, incident light is received by the photo-sensing device through the lens, and the photo-sensing device converts the received light into an electronic signal, which is transferred to the package element through the circuit of the circuit board. The package element generates a digital image signal based on the received electronic signal through a signal process, and the digital image signal is transferred to the connection slot through the circuit of the circuit board.

Another objective of the present invention is to provide a method of manufacturing detachable lens structure, generally comprising steps of manufacturing photo-sensing package module, jointing lid and lens, and jointing protection case and connection line.

One feature of the present invention is that the package element of the photo-sensing module is formed as one single module through the SiP technology to simplify the assembling process.

Another feature of the present invention is that the package element of the photo-sensing module is formed as one single module through the SiP technology to achieve protection effects of anti-dust, anti-abrasion, and anti-corrosion.

Another feature of the present invention is that the lens is detachably jointed, instead of being secured onto the circuit board in the prior arts, the lens is easily replaced in maintenance, and more flexibility and less cost are achieved.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
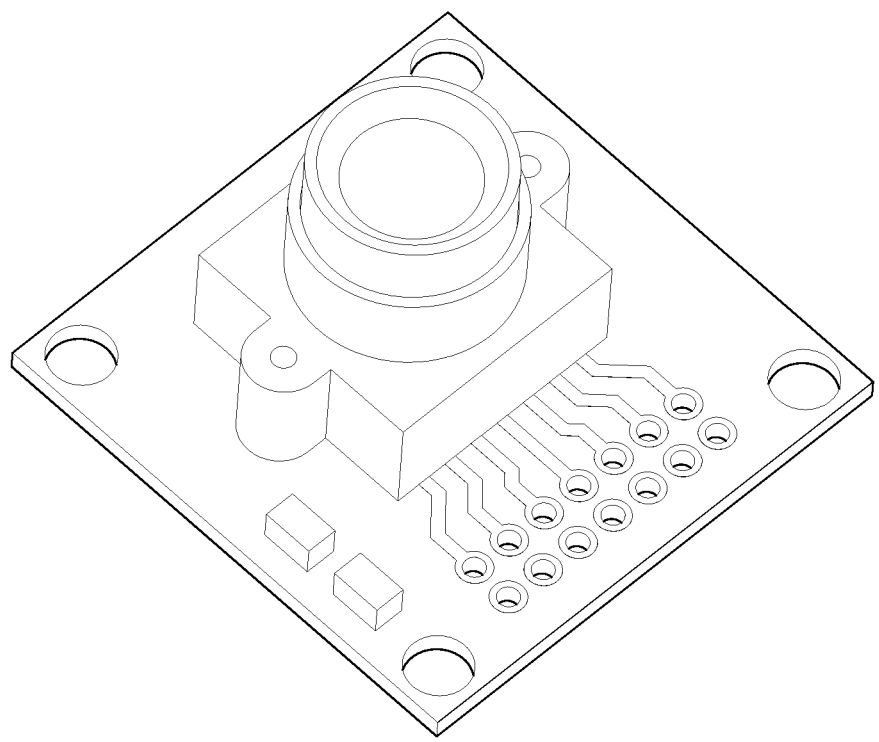
FIG. 1 is a view showing the lens module in the prior arts.
Figure 2:
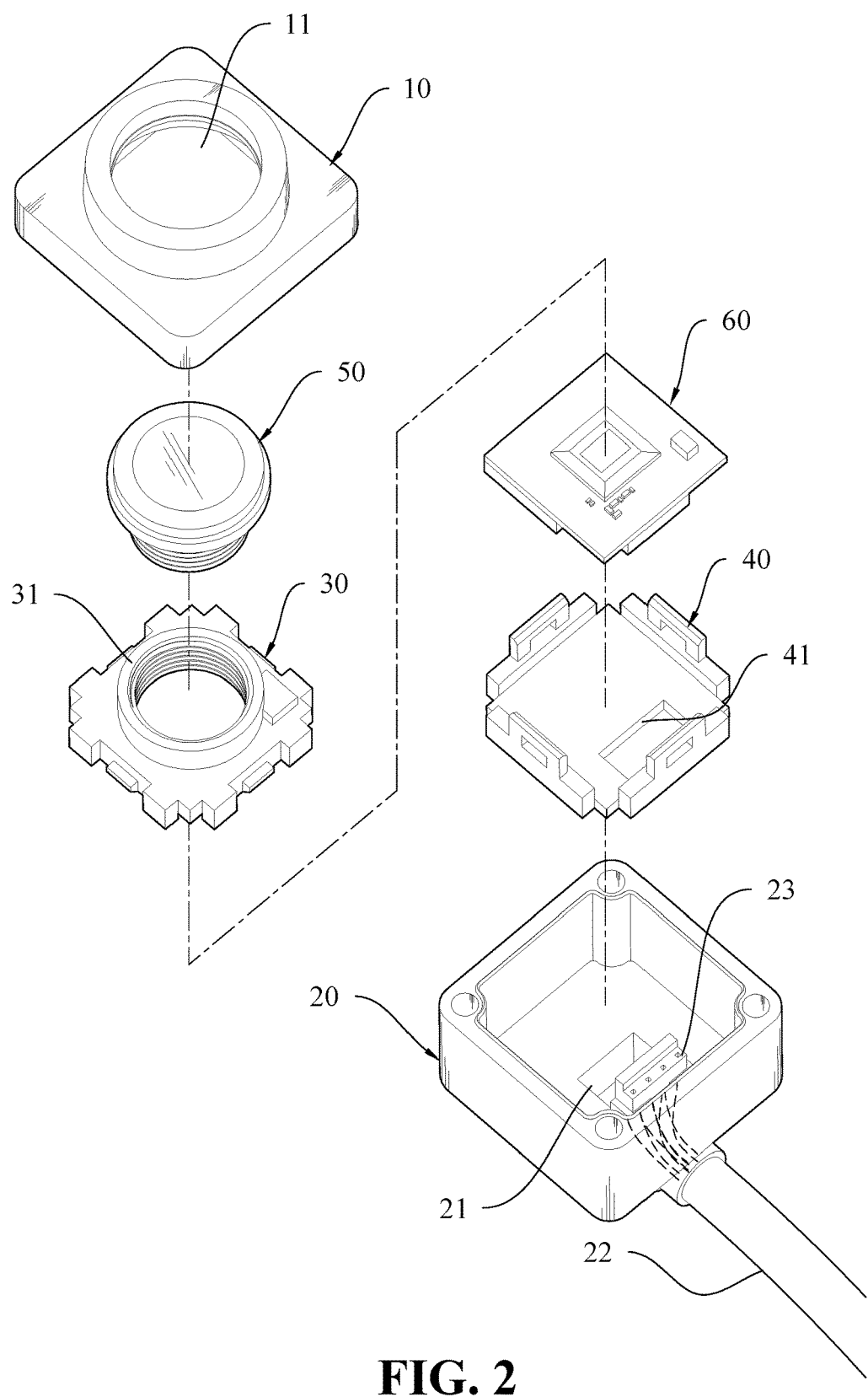
FIG. 2 is a 3D exploded view of the detachable lens structure according to the first embodiment of the present invention.

Please refer to FIG. 2 illustrating the detachable lens structure according to the embodiment of the present invention. The detachable lens structure of the present invention generally comprises a front protection case 10, a back protection case 20, a front lid 30, a back lid 40, a lens 50, and a photo-sensing package module 60. The front protection case 10 and the back protection case 20 are detachably jointed together to form an accommodating space, which accommodates the front lid 30, the back lid 40, the lens 50, and the photo-sensing package module 60. The photo-sensing package module 60 is accommodated in another accommodating space formed by the front lid 30 and the back lid 40.

Further, the front protection case 10 is provided with a first opening 11, the back protection case 20 is provided with a through hole 21 for a connection line 22 and a connection plug 23 connected together to pass through, and the connection plug 23 is specifically accommodated in the accommodating space. The front lid 30 is provided a second opening 31, the back lid 40 is provided a third opening 41, and particularly, the front lid 30 and the back lid 40 are detachably jointed together.

Figure 3:
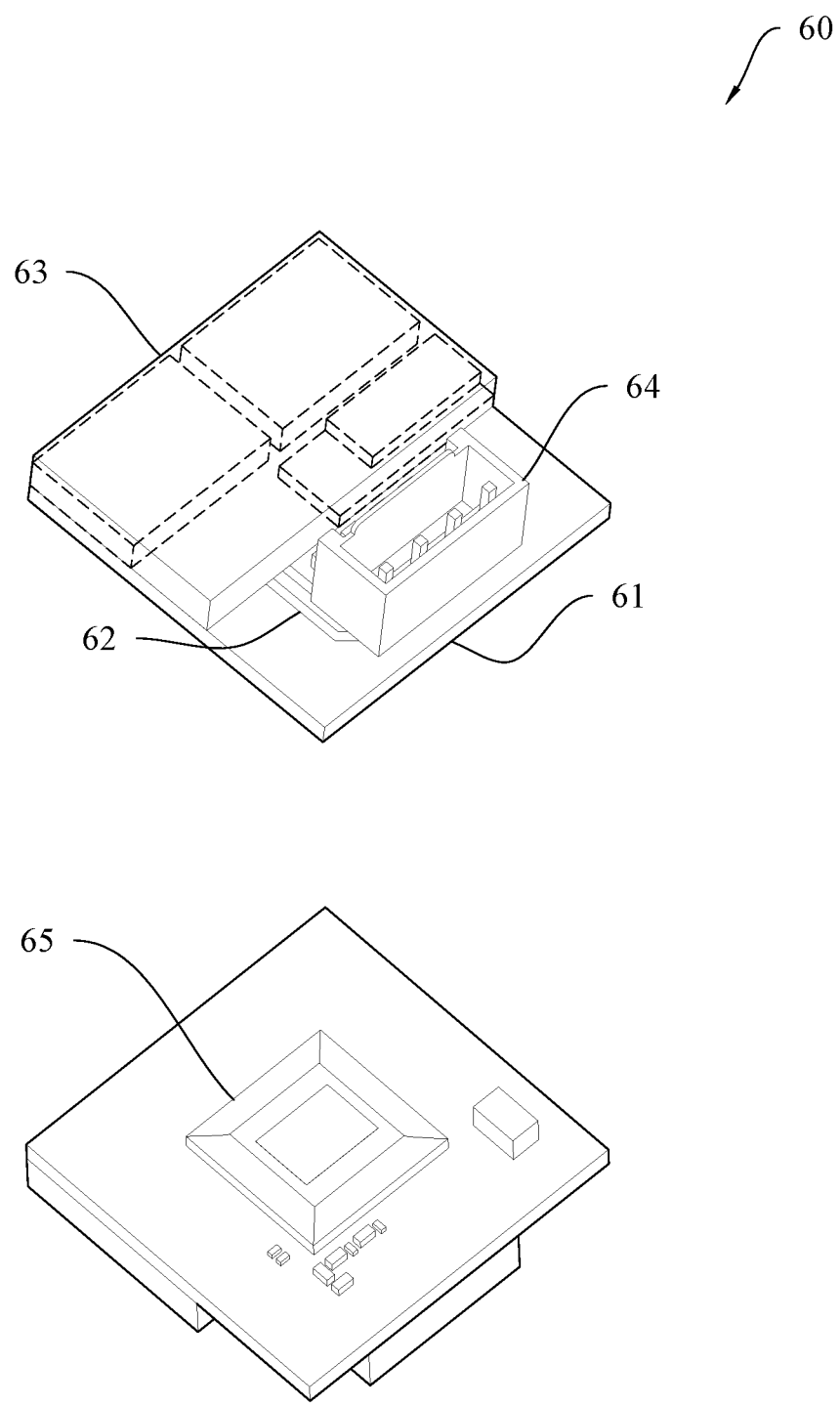
FIG. 3 is a view showing the photo-sensing package module of the detachable lens structure.

Refer to FIG. 3 illustrating the photo-sensing package module 60 of the detachable lens structure. The photo-sensing package module 60 comprises a circuit board 61, a circuit 62, a package element 63, a connection slot 64, and a photo-sensing device 65. The package element 63 and the connection slot 64 are on the same side of the circuit board 61, and the photo-sensing device 65 is on the other side of the circuit board 61. The package element 63, the connection slot 64, and the photo-sensing device 65 are electrically connected to the circuit 62.

Return back to FIG. 2. The second opening 31 of the front lid 30 aligns the photo-sensing device 65 of the photo-sensing package module 60, and is located at and outward protruding from a mediate region of the front lid 30 such that the front lid 30 is easily jointed with one end of the lens 50. The third opening 41 of the back lid 40 aligns the connection slot 64 of the photo-sensing package module 60, and part of the connection slot 64 is specifically exposed for the connection line plug 23 to insert.

The first opening 11 of the front protection case 10 aligns the other end of the lens 50, and is located at and outward extending from a mediate region of the front protection case 10 such that the lens 50 receives incident light. The connection line plug 23 of the back protection case 20 aligns and inserts into the exposed connection slot 64. Further, the detachable lens structure of the present invention is connected to an external device via the connection line 22.

Figure 4:
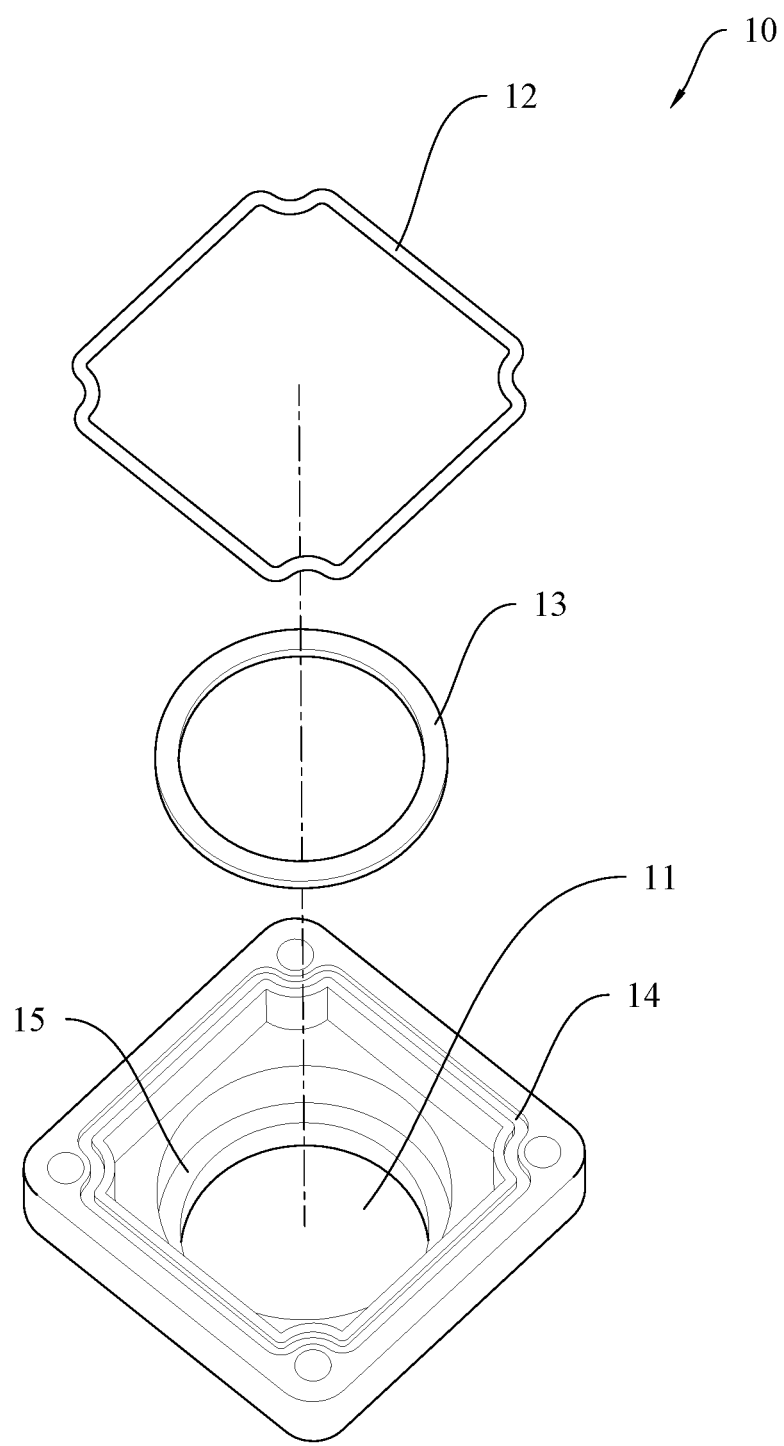
FIG. 4 is a view showing the inside of the front protection case of the detachable lens structure.

In particular, as shown in FIG. 4, the front protection case 10 further comprises a first water-proof ring 12 and a second water-proof ring 13, and is provided with a first slot 14 and a second slot 15. The first slot 14 is around the front protection case 10, the second slot 15 is around the first opening 11, and the first water-proof ring 12 is placed in the first slot 14 such that the front protection case 10 and the back protection case 20 are tightly jointed together. The second water-proof ring 13 is accommodated in the second slot 15 such that the first opening 11 and the lens 50 are tightly jointed. Thus, a double water-proof function is achieved.

In addition, the package element 63 of the photo-sensing package module 60 is employed to package and integrate a plurality of electronic devices or electronic modules through System in Package (SiP) technology. The package element 63 and the connection slot 64 are inlaid on the same side of the circuit board 61, and the photo-sensing device 65 is inlaid on the other side, and specifically located at a mediate region of the circuit board 61.

The photo-sensing device 65 is preferably implemented by a charge-coupled device (CCD) or a complementary metal-oxide-semiconductor (CMOS).

Figure 5:
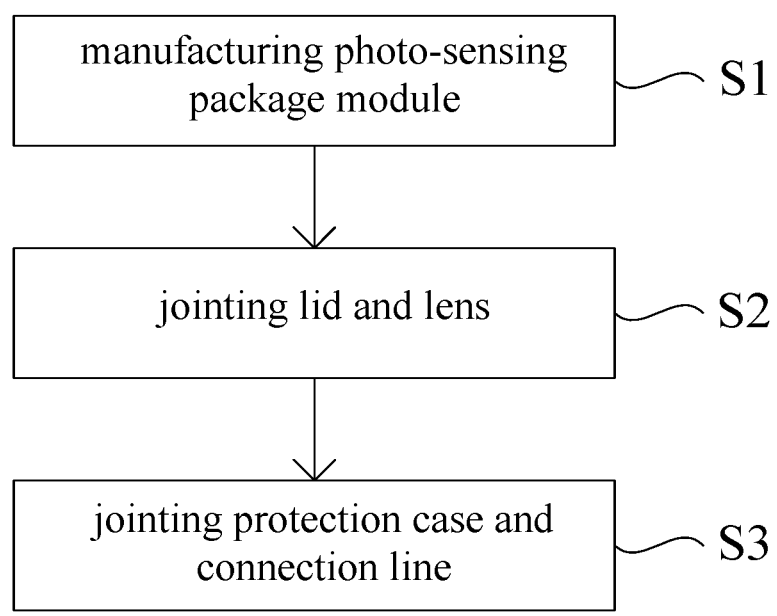
FIG. 5 is a flowchart showing the method of manufacturing detachable lens structure according to the second embodiment of the present invention.

Then, refer to FIG. 5 illustrating the method of manufacturing detachable lens structure according to the second embodiment of the present invention. The method of the second embodiment comprises steps of manufacturing photo-sensing package module S1, jointing lid and lens S2, and jointing protection case and connection line S3.

Figure 6:
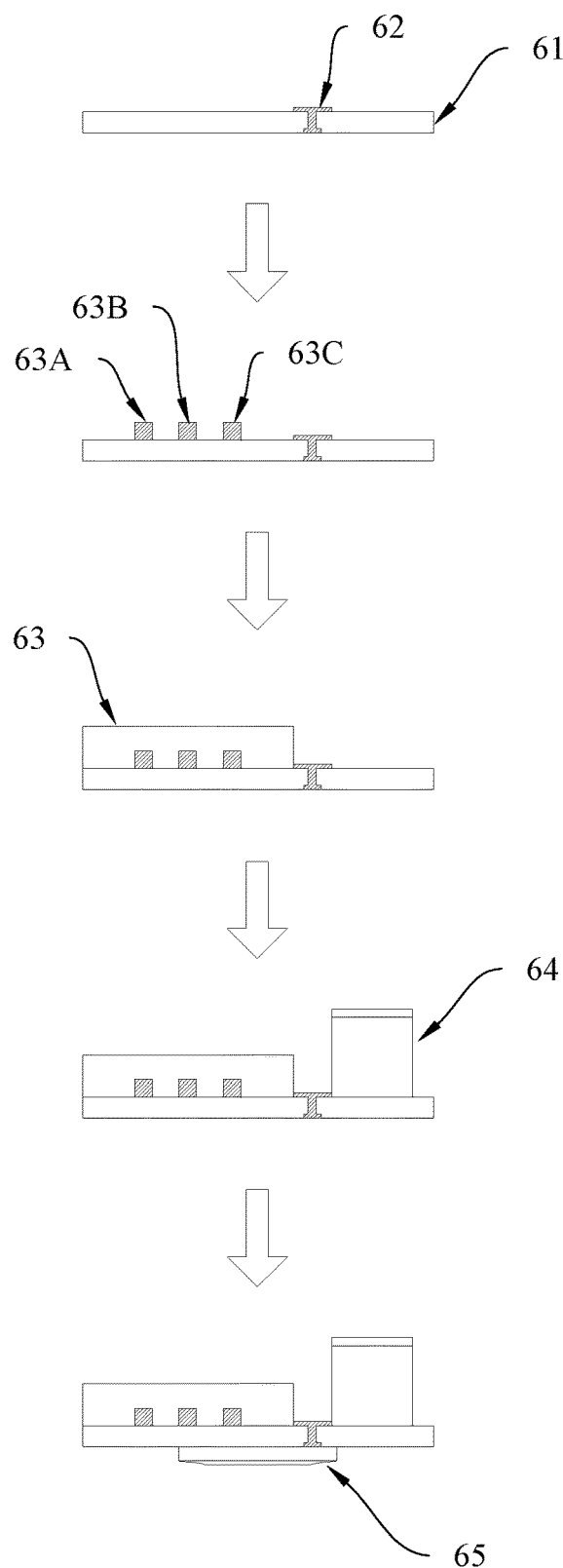
FIG. 6 is a view showing the processes of assembling the photo-sensing package module.

Specifically, the step of manufacturing photo-sensing package module S1 is clearly shown FIG. 6. At first, the circuit board 61 is provided with the specific circuit 62, and at least one of the electronic elements and modules (like the electronic elements 63A, 63B, and 63C) is inlaid in a certain region. Then, the electronic elements and modules are packaged and integrated into the package element 63 by means of Multi-chip Module (MCM), Multi-chip Package (MCP), Stack Die, or Package on Package. The package element 63 and the circuit 62 are connected. Then, the connection slot 64 is inlaid on the same side of the circuit board 61 as the package element 63, but on the other end of the circuit board 61 such that the connection slot 64 and the package element 63 are separate on the same side. The connection slot 64 is also connected to the circuit 62. Finally, the photo-sensing device 65 is inlaid at the mediate region of the other side of the circuit board 61, and is connected to the circuit 62 to form the photo-sensing package module 60.

Figure 7:
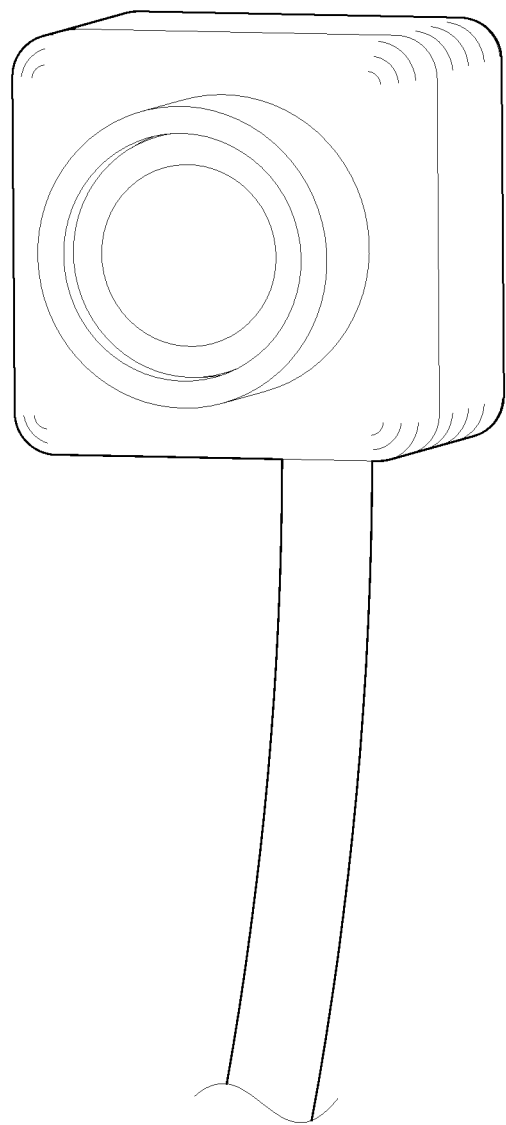
FIG. 7 is a view showing the assembled detachable lens structure.

The step of jointing lid and lens S2 is shown in FIG. 7. The above photo-sensing package module 60 is placed in the accommodating space formed by the front lid 30 and the back lid 40. The second opening 31 of the front lid 30 aligns the photo-sensing device 65, and the third opening 41 of the back lid 40 aligns the connection slot 64 such that the front lid 30 and the back lid 40 are fully jointed together with part of the connection slot 64 exposed. One end of the lens 50 joints the second opening 31 of the front lid 30 for a module lens.

At last, in the step of jointing protection case and connection line S3, the first water-proof ring 12 is placed in the first slot 14 of the front protection case 10, the second water-proof ring 13 is placed in the second slot 15, the module lens is placed in the accommodating space formed by the front protection case 10 and the back protection case 20, the connection line plug 23 aligns and inserts into the exposed connection slot 64, and the other end of lens 50 aligns the first opening 11 of the front protection case 10. Thus, the front protection case 10 and the back protection case 20 are detachably jointed together through the first water-proof ring 12 and the second water-proof ring 13. Further, the detachable lens structure of the present invention is connected to the external device via the connection line 22 as shown in FIG. 7.

In actual applications, light is incident onto the lens 50, and received and sensed by the photo-sensing device 65 to generate an electronic signal, which is transferred to the package element 63 through the circuit 62 of the circuit board 61. The package element 63 processes the electronic signal to generate a digital image signal, which is transferred to the connection slot 64 through the circuit 62 of the circuit board 61. The connection slot 64 transmits the digital image signal to the external device via the connection line 22.

From the above mention, the primary feature of the present invention is that the photo-sensing package module is packaged as a single element through SiP, only simple processes are needed, greatly improves efficiency of integration design, and reduces cost of manufacturing in comparison with Printed Circuit Board Assembly (PCBA) in the prior arts, which requires more elements, complicated processes and tests.

Another feature of the present invention is that the SiP technology makes the electronic elements and modules of the detachable lens structure as one package element, instead of directly soldering the electronic elements or modules on the circuit board in the prior arts, thereby reducing area, complexity and power consumption of the circuit board, and achieving protection effects of anti-dust, anti-abrasion, and anti-corrosion.

A yet feature of the present invention is that the lens is detachably jointed, and the user can easily replace the lens by himself. However, the photo-sensing device and other module circuit are printed on the circuit board, and the lens is secured onto the respective circuit board to align the photo-sensing device in the prior arts. Thus, when the lens is damaged and needed to replaced, the whole module circuit and lens must be replaced. The present invention is more flexible in application, and cost effective.

An additional feature of the present invention is that the front protection case is provided with two water-proof rings, one around the inside of the front protection case, and the other located in the inside of the first opening. As a result, water-proof protection for the detachable lens structure is greatly enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A detachable lens structure, comprising:
   a front protection case provided with a first opening located at and outward extending from a mediate region of the front protection case;
   a back protection case provided with a through hole for a connection line and a connection plug connected together to pass through;
   a front lid provided a second opening located at and outward protruding from a mediate region of the front lid;
   a back lid provided a third opening;
   a lens; and
   a photo-sensing package module comprising a circuit board, a circuit, a package element, a connection slot, and a photo-sensing device, the package element, the connection slot, and the photo-sensing device electrically connected to the circuit, the package element and the connection slot located on one side of the circuit board, the photo-sensing device inlaid in the other side of the circuit board and located at a mediate region of the circuit board, the package element employed to integrate a plurality of electronic devices or electronic modules through System in Package (SiP) technology,
   wherein the front protection case and the back protection case are detachably jointed together to form an accommodating space for accommodating the front lid, the back lid, the lens, and the photo-sensing package module, the photo-sensing package module is accommodated between the front lid and the back lid, the second opening aligns the photo-sensing device of the photo-sensing package module, the third opening aligns the connection slot of the photo-sensing package module, the front lid and the back lid are detachably jointed together, part of the connection slot is exposed through the third opening, one end of the lens and the second opening are detachably jointed together, the end of the lens aligns the first opening, the connection line plug is accommodated in the accommodating space and aligns the exposed connection slot, the lens receives and transfers incident light to the photo-sensing device of the photo-sensing package module, the photo-sensing device converts the received light into an electronic signal, the electronic signal is transferred to the package element through the circuit of the circuit board, the package element generates a digital image signal based on the received electronic signal through a signal process, and the digital image signal is transferred to the connection slot through the circuit of the circuit board, and further transmitted to an external device via the connection line.

2. The detachable lens structure as claimed in claim 1, further comprising a first water-proof ring and a second water-proof ring, wherein the front protection case is provided with a first slot and a second slot, the first water-proof ring is around the front protection case, the second water-proof ring is around the first opening, the first water-proof ring is accommodated in the first slot to tightly joint the front protection case and the back protection case, and the second water-proof ring is accommodated in the second slot to tightly joint the first opening and the lens.

3. The detachable lens structure as claimed in claim 1, wherein the photo-sensing device is implemented by a charge-coupled device (CCD) or a complementary metal-oxide-semiconductor (CMOS).

4. A method of manufacturing a detachable lens structure, comprising:
   a step of manufacturing a photo-sensing package module, comprising providing a circuit board comprising a circuit and a plurality of electronic elements and electronic modules inlaid, integrating the electronic elements and the electronic modules into a package element through System in Package (SiP) technology, inlaying a connection slot onto the same side of the circuit board as the package element inlaid, and inlaying a photo-sensing device at a mediate region of the other side of the circuit board to form a photo-sensing package module;

a step of jointing lid and lens, comprising placing the photo-sensing package module in an accommodating space formed by a front lid and a back lid, the front lid provided with a second opening aligning the photo-sensing device, the back lid provided with a third opening aligning the connection slot, detachably jointing the front lid and the back lid with part of the connection slot exposed, and connecting one end of a lens to the second opening to form a module lens; and a step of jointing a connection line, comprising placing the module lens in an another accommodating space formed by a front protection case and a back protection case, the front protection case provided with a first opening, a first water-roof ring, and a second waterproof ring, the back protection case provided with a through hole for the connection line and a connection line plug connected to pass through, placing the first water-roof ring in a first slot of the front protection lid, placing the second water-roof ring in a second slot of the front protection lid, inserting the connection line plug into the connection slot, aligning the other end of the lens to the first opening, detachably jointing the front protection case and the back protection case, and connecting the connection line to an external device, wherein the first opening is located at and extending outward from a mediate region of the front protection case, and the second opening is located at and extending outward from a mediate region of the front lid.

5. The method as claimed in claim 4, wherein the System in Package technology comprises means of Multi-chip Module (MCM), Multi-chip Package (MCP), Stack Die, or Package on Package.

6. The method as claimed in claim 4, wherein the photo-sensing device is implemented by a charge-coupled device (CCD) or a complementary metal-oxide-semiconductor (CMOS).

* * * * *